United States Patent
Barile et al.

(10) Patent No.: US 11,586,089 B2
(45) Date of Patent: Feb. 21, 2023

(54) DYNAMIC WINDOWS COMPRISING AQUEOUS ELECTROLYTES HAVING ENHANCED TEMPERATURE STABILITY

(71) Applicants: The Board of Trustees of the Leland Stanford Junior University, Stanford, CA (US); Board of Regents of the Nevada System of Higher Education, on behalf of the University of Nevada, Reno, Reno, NV (US)

(72) Inventors: Christopher J. Barile, Reno, NV (US); Michael David McGehee, Palo Alto, CA (US); Daniel J. Slotcavage, Menlo Park, CA (US)

(73) Assignees: The Board of Trustees of the Leland Stanford Junior University, Stanford, CA (US); Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 307 days.

(21) Appl. No.: 16/764,774

(22) PCT Filed: Nov. 16, 2018

(86) PCT No.: PCT/US2018/061642
§ 371 (c)(1),
(2) Date: May 15, 2020

(87) PCT Pub. No.: WO2019/099919
PCT Pub. Date: May 23, 2019

(65) Prior Publication Data
US 2020/0363690 A1    Nov. 19, 2020

Related U.S. Application Data

(60) Provisional application No. 62/588,135, filed on Nov. 17, 2017.

(51) Int. Cl.
*G02F 1/1506* (2019.01)
*G02F 1/155* (2006.01)

(52) U.S. Cl.
CPC .......... *G02F 1/1506* (2013.01); *G02F 1/155* (2013.01); *G02F 2202/28* (2013.01)

(58) Field of Classification Search
None
See application file for complete search history.

(56) References Cited

U.S. PATENT DOCUMENTS 2,315,321 A  *  3/1943  Evans ............... C09K 3/12
                                              524/21
5,903,382 A      5/1999  Tench et al.
(Continued)

FOREIGN PATENT DOCUMENTS

WO     2005/084350 A2     9/2005

OTHER PUBLICATIONS

Antifreeze, Wikipedia, https://en.wikipedia.org/wiki/Antifreeze, Jan. 2, 2019.
(Continued)

*Primary Examiner* — Ryan Crockett
(74) *Attorney, Agent, or Firm* — Kaplan Breyer Schwarz, LLP

(57) ABSTRACT

The present disclosure is directed toward an electrodeposition-based dynamic glass element comprising an electrolyte that includes an aqueous solvent and an additive, wherein the electrolyte is stable over a temperature range that is greater than the stable temperature range of the aqueous solvent alone. In some embodiments, the freezing point of the electrolyte is lowered by its inclusion of the additive. Additives suitable for use in accordance with the present disclosure include alcohols, metal salts, sugars, cryoprotectants, and the like. In some cases, the freezing point of the (Continued)

aqueous-solvent-based electrolyte is lowered from 0° C. to −40° C. by virtue of the inclusion of the additive. In some cases, the maximum stable temperature of the electrolyte is increased from 100° C. to 110° C. by virtue of the inclusion of the additive.

15 Claims, 11 Drawing Sheets

(56) References Cited

U.S. PATENT DOCUMENTS

| | | | |
|---|---|---|---|
| 5,923,456 | A | 7/1999 | Tench et al. |
| 6,552,843 | B1 * | 4/2003 | Tench ............... G02F 1/1506 359/321 |
| 7,317,566 | B2 | 1/2008 | Tench et al. |
| 2005/0248825 | A1 * | 11/2005 | Warren ............. G02F 1/1506 359/265 |
| 2014/0338728 | A1 * | 11/2014 | Cheyns ............. H01L 27/3204 438/34 |
| 2014/0356524 | A1 * | 12/2014 | Gao .................. H01B 1/20 252/514 |
| 2015/0146276 | A1 * | 5/2015 | Kim .................. G02F 1/155 359/270 |
| 2016/0139475 | A1 * | 5/2016 | Garcia ............... C03C 17/23 29/829 |
| 2016/0223878 | A1 * | 8/2016 | Tran ................. G02F 1/1533 |
| 2020/0142273 | A1 * | 5/2020 | Barile ............... C23C 16/45525 |

OTHER PUBLICATIONS

Authorized Officer: Shane Thomas, International Search Report and Written Opinion issued in counterpart PCT application No. PCT/US2018/061642, dated Jan. 31, 2019, 8 pp.

Christopher J. Barile et al., "Dynamic Windows with Neutral Color, High Contrast, and Excellent Durability Using Reversible Metal Electrodeposition", "Joule", Sep. 6, 2017, pp. 133-145, vol. 1 Issue 1.

* cited by examiner

DYNAMIC WINDOWS COMPRISING AQUEOUS ELECTROLYTES HAVING ENHANCED TEMPERATURE STABILITY

STATEMENT OF RELATED CASES

This application case claims priority of U.S. Provisional Patent Application Ser. No. 62/588,135 filed on Nov. 17, 2017, which is incorporated herein by reference.

TECHNICAL FIELD

The present disclosure relates to optics in general, and, more particularly, to devices having a controlled optical transmissivity.

TECHNICAL FIELD

The present disclosure relates to optics in general, and, more particularly, to devices having a controlled optical transmissivity.

BACKGROUND

Glass having electronically controllable transmissivity (sometimes referred to as "dynamic" or "smart" glass) is attractive for use in many applications, such as energy-efficient windows, dynamic vehicle mirrors, variable-reflectivity sunglasses, vehicle sunroofs, and the like. The use of dynamic-glass in building windows, for example, enables decreased energy consumption by controlling the amount of sunlight that passes through them, reducing the energy load for heating and cooling systems.

Unfortunately, conventional dynamic glass has been difficult to commercialize in large scale due to problems associated with durability, color, switching speed, and cost. Typical prior-art dynamic glass is based on electrochromic material, which changes its transmission properties in response to an applied voltage. In fact, the vast majority of research on dynamic glass over the past four decades has been focused on transition metal oxides or polymeric materials as electrochromic materials. The most dominant conventional technologies to date include suspended-particle devices, polymer-dispersed liquid crystal devices, and electrochromic devices.

Suspended-particle devices are attractive for use in automotive applications because they can have switching times on the order of a few seconds. Unfortunately, they are extremely expensive, are hazy and require power when in their clear state, and are not color neutral (i.e., they are characterized by a blue color).

Polymer-dispersed liquid crystal devices also have fast switching times; however, they have poor contrast and are also hazy and require power when in their clear state.

Electrochromic devices have been employed in building windows for decades, have low haze, and good contrast ratio. Unfortunately, they change states very slowly (of order several minutes), have mediocre infrared performance, and often require toxic materials.

In contrast, dynamic windows based on reversible electrodeposition of metals on transparent electrodes are seen as having the potential to overcome some of the disadvantages of other prior-art smart glasses. Examples of dynamic glass-based devices are described by D.M Tench, et al., in U.S. Pat. Nos. 5,903,382, 5,923,456, and 7,317,566, each of which is incorporated herein by reference. In such devices, a non-aqueous gel electrolyte containing metal ions, such as propylene carbonate, y-butyrolactone, etc., is disposed between a pair of electrodes on which atoms of the same metal reside. In response to a voltage applied to the electrodes, metal dissolves from one electrode and deposits on the other. By reversing the polarity of the voltage, the direction in which the metal migration occurs is also reversed. Electrodeposition-based dynamic windows also have a significant advantage over other dynamic glasses in that they dissipate no power except while they are changing transmissivity state.

Several challenges for prior-art, electrodeposition-based dynamic glasses remain, however. First, very high voltages are required to provide large over-potentials to enable electrodeposition. This need for high voltage arises from: (1) the fact that electrolyte solvents exhibit significant ion pairing that can reduce the kinetics and reversibility of the electrodeposition process; and (2) undesirable side reactions in the solvent-electrolyte system associated with reversible electrodeposition.

Second, the robustness of their electrodes is typically poor, leading to short lifetimes and the need to steadily increase the applied voltage to obtain the same level of transmissivities through multiple cycles.

Third, the deposition uniformity over large areas is quite poor for prior-art, electrodeposition-based dynamic devices, thereby limiting their size in practice.

Fourth, it has proven difficult to obtain glasses having high-contrast and neutral color response.

Finally, these glasses typically exhibit significant irising, which gives rise to non-uniformity of response across their lateral extent.

More recently, electrodeposition-based dynamic glasses comprising aqueous-gel electrolytes have been developed, which provide significantly improved durability and contrast ratios. Examples of such dynamic windows were described in U.S. Provisional Patent Application Ser. No. 62/534918, filed Jul. 20, 2017, which is incorporated herein by reference. These dynamic windows demonstrated excellent durability, contrast ratios greater than 80%, switching times on the order of a few minutes, and promise improved manufacturability using low cost, solution-based manufacturing techniques.

Unfortunately, while aqueous-based electrolytes promote facile electrodeposition, they have a temperature-stable range of only about 0° C. to 100° C., which is unacceptably narrow for many applications. For example, sky-roofs or rear-view mirrors for vehicles are subjected to the temperature of the interior temperature of the vehicle, which can range from well below zero ° F. to more than 120 ° F. When exposed to temperatures below 0° C., however, expansion of an aqueous electrolyte cause result in fracture of its window glass. In addition, even for applications in which temperature is normally controlled within a moderate range (e.g., the interior of an office building, etc.), the risk of catastrophic device failure from freezing would normally be considered too high. As a result, the adoption of aqueous-electrolyte-based dynamic glass has been slow.

The need for a volume-manufacturable dynamic glass that can be subjected to large temperature excursions while also exhibiting high contrast, good uniformity, fast response time, low cost, and long lifetime remains, as yet, unmet by the prior-art.

SUMMARY

The present disclosure enables aqueous-electrolyte-based dynamic glass devices that have a greater temperature range over which they are stable and operative. Embodiments of in accordance with the present disclosure mitigate issues associated with the limited temperature range of aqueous-based electrolytes in electrodeposition-type dynamic windows by including additives that increase the temperature stability of their electrolytes.

Like the prior art, dynamic glass elements in accordance with the present disclosure employ a water-based electrolyte that facilitates rapid and reversible electrodeposition of a metal on a window electrode. In sharp contrast to the prior art, however, electrolytes in accordance with the present disclosure include an alcohol-based additive that extends the range of temperatures over which the electrolyte remains in liquid phase. As a result, devices in accordance with the present disclosure can be used in a much wider range of applications than prior-art devices.

An illustrative embodiment is a dynamic-glass element that comprises a transparent window electrode disposed on a first transparent substrate, a counter electrode disposed on a second transparent substrate, and a copper-bismuth-based aqueous electrolyte that resides between the electrodes. The aqueous electrolyte includes a methanol-based additive such that the mixture has a 60:40 ratio of additive to water-based electrolyte. The presence of the additive in the electrolyte extends the temperature range over which the electrolyte is stable from an initial range of approximately 0° C. through approximately 100° C. to an extended range from approximately −40° C. through approximately 110° C.

In some embodiments, the additive includes a different chemical or mixture, such as ethylene glycol, glycerol, propylene glycol, 1,3-propanediol, ethanol, isopropanol, propanol, and the like.

In some embodiments, the additive comprises a metal salt, such as $CaCl_2$, $MgCl_2$, $NH_4Cl$, and $Na_2SO_4$, and the like.

In some embodiments, the additive includes a different chemical/compound, such as a cryoprotectant (e.g., DMSO, etc.), a sugar (e.g., trehalose, glucose, etc.), and the like.

In some embodiments, the concentration of additive in the electrolyte is greater than 0% and less than or equal to 70%.

An embodiment in accordance with the present disclosure is a dynamic-glass element (100) comprising: a first electrode (106); a second electrode (108); and an electrolyte (110) that is located between the first and second electrodes, wherein the electrolyte includes an aqueous solvent (128) and an additive (130), and wherein the solvent is stable over a first temperature range and the electrolyte is stable over a second temperature range that is larger than the first temperature range.

Another embodiment in accordance with the present disclosure is a method for forming a dynamic glass element, the method comprising: providing a first electrode (106) disposed on a first substrate (102); providing a second electrode (108) disposed on a second substrate (104); arranging the first and second substrates to define a chamber (306); and providing an electrolyte (110) in the chamber such that each of the first and second electrodes is in contact with the electrolyte, wherein the electrolyte includes an aqueous solvent (128) and an additive (130), and wherein the solvent is stable over a first temperature range and the electrolyte is stable over a second temperature range that is larger than the first temperature range.

DETAILED DESCRIPTION

Figure 1:
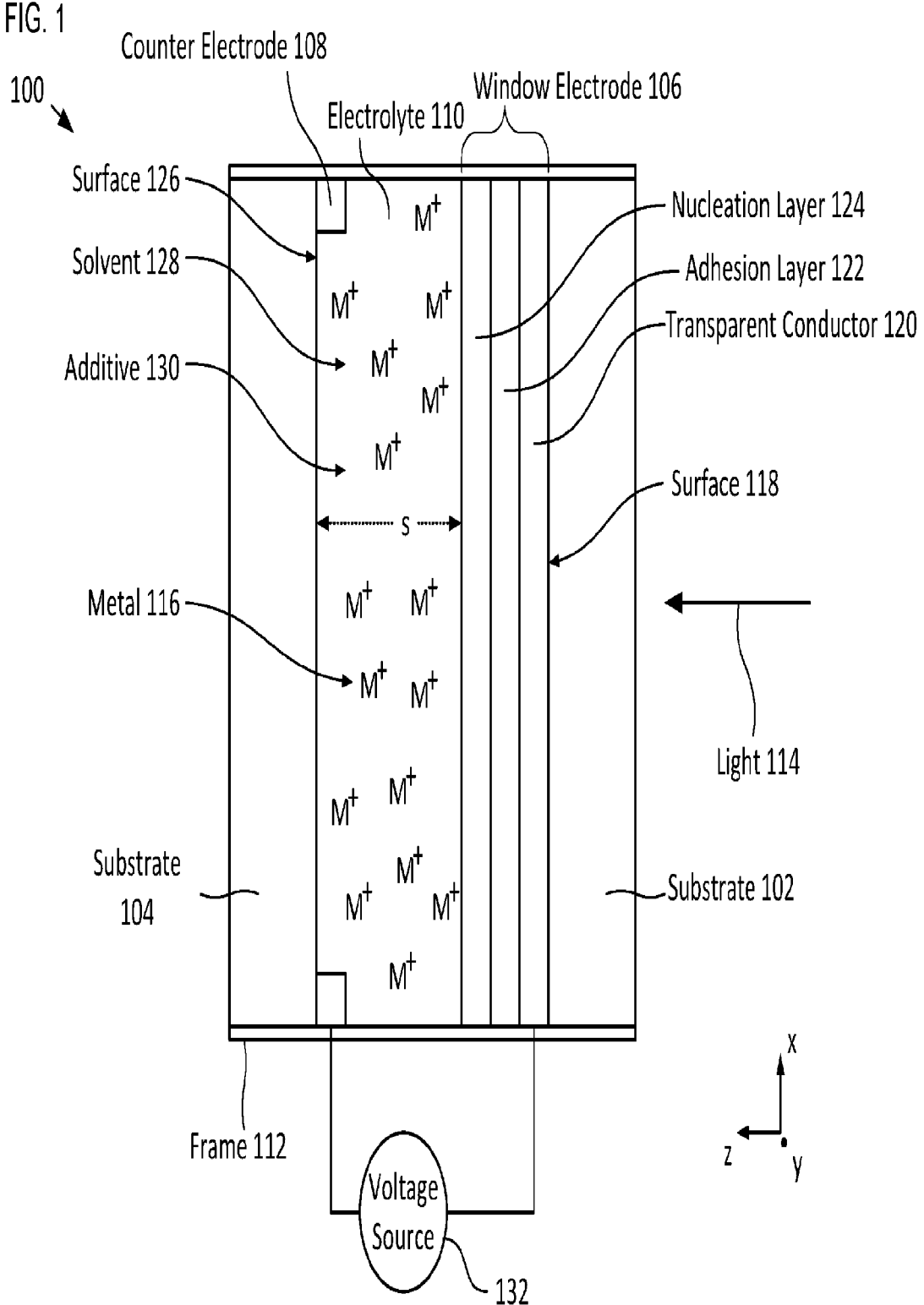
FIG. 1 depicts a schematic drawing of a cross-sectional view of an illustrative embodiment of a dynamic-glass window in accordance with the present disclosure.

FIG. 1 depicts a schematic drawing of a cross-sectional view of an illustrative embodiment of a dynamic-glass window in accordance with the present disclosure. Window 100 comprises substrates 102 and 104, window electrode 106, counter electrode 108, electrolyte 110 and frame 112. Window 100 is configured to control its transmissivity for light 114 via reversible electrodeposition of metal 116. In the depicted example, light 114 is sunlight.

Figure 2:
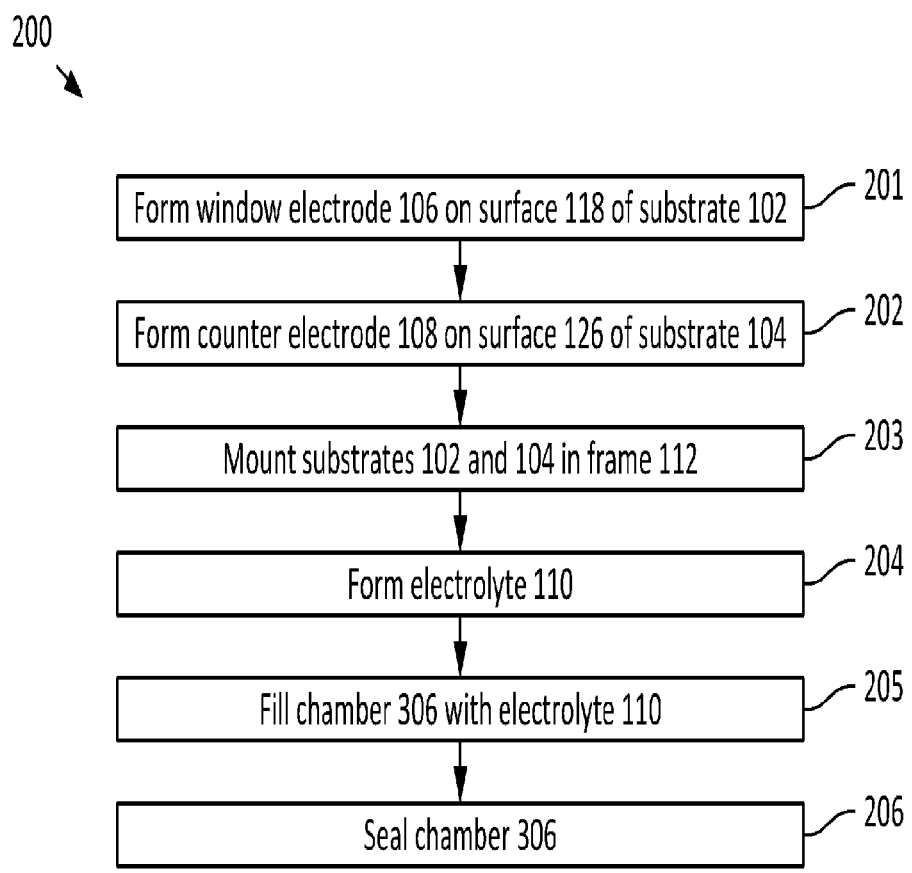
FIG. 2 depicts operations of a method suitable for forming a dynamic glass window in accordance with the illustrative embodiment.

FIG. 2 depicts operations of a method suitable for forming a dynamic glass window in accordance with the illustrative embodiment. Method 200 begins with operation 201, wherein window electrode 106 is formed on surface 118 of substrate 102. Method 200 is described herein with continuing reference to FIG. 1, as well as reference to FIGS. 2-4.

FIGS. 3A-D depicts a dynamic-glass-based window at different stages of its fabrication in accordance with the illustrative embodiment.

Substrate 102 is a transparent, mechanically robust substrate suitable for use as an outer layer in a dynamic-glass element. For the purposes of the present disclosure, including the appended claims, the term "transparent" is defined as substantially transmissive for the spectral content of light 114. In the illustrative embodiment, substrate 102 is a conventional glass substrate. In some embodiments, substrate 102 is a flexible, transparent substrate, such as a layer of polyethylene terephthalate (PET), polyester, other plastics, etc. In some embodiments, light 114 includes electromagnetic radiation other than sunlight and substrate 102 comprises a different rigid or flexible material.

Window electrode 106 is a multi-layer, transparent, electrically conductive layer disposed on surface 118 of substrate 102 such that the window electrode is in contact with electrolyte 110 when window 100 is fully assembled. It should be noted, that, although window electrode 106 is a multi-layer structure in the depicted example, in some embodiments, window electrode 106 includes only a single layer. Furthermore, in some embodiments, an adhesion layer is not included in the structure of window electrode 106.

Figure 4:
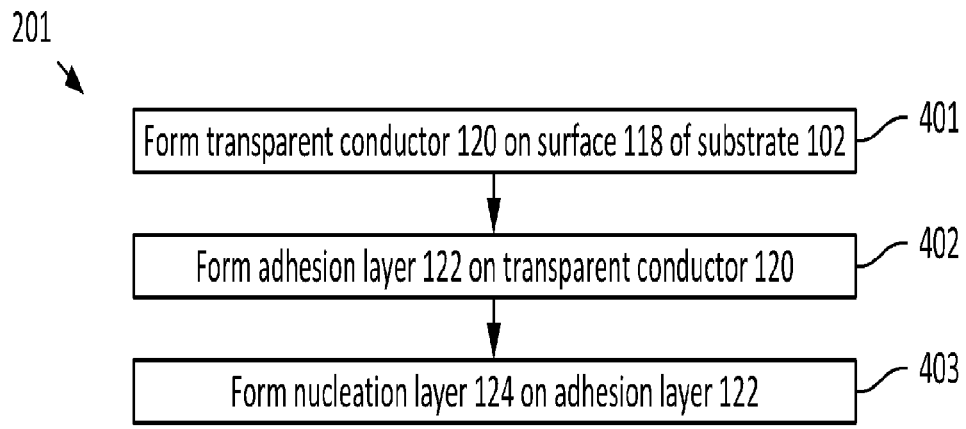
FIG. 4 depicts exemplary sub-operations suitable for use in operation 201.

FIG. 4 depicts exemplary sub-operations suitable for use in operation 201.

Operation 201 begins with sub-operation 401, wherein transparent conductor 120 is formed on surface 118 of substrate 102 in conventional fashion (e.g., evaporation, sputtering, etc.).

In the depicted example, transparent conductor 120 is a layer of indium tin oxide (ITO) disposed on the entire interior surface of substrate 102. In some embodiments, transparent conductor 120 comprises a transparent conducting material other than ITO, such as a different conducting oxide (e.g., fluorine-doped tin oxide (FTO), doped zinc oxide (ZnO), etc.), a conducting polymer (e.g., poly(3,4-ethylenedioxythiophene) (PEDOT), Poly(4,4-dioctyl cyclopentadithiophene), etc.), carbon nanotubes, and the like.

At sub-operation 402, adhesion layer 122 is formed on transparent conductor 120.

Adhesion layer 122 is a layer that is configured to anchor nucleation layer 124 to the transparent conductor. In other words, adhesion layer 122 facilitates bonding nucleation layer 124 and transparent conductor 120. In some embodiments, adhesion layer forms covalent bonds with the material of at least one of these layers.

It should be noted that the transmissivity of window electrode 104 is intimately related to the morphology of the metal layer that electrodeposits on the window electrode surface. For a completely uniform compact metal film, for example, the Beer-Lambert law indicates that the transmission of an electrode will exponentially decrease with respect to the thickness of metal electrodeposited. It is known in the prior art that a nucleation layer comprising platinum nanoparticles can improve the quality of electrodeposition on the surface of a transparent electrode. U.S. Pat. No. 6,552,843, for example, describes a transparent electrode having a surface modification layer comprising a noble metal (e.g., platinum, iridium, gold, osmium, etc.) formed on a transparent electrode while also employing an underlayer of another metal to improve adhesion of the surface modification layer.

Unfortunately, in the prior art, the formation of an adhesion layer typically requires deposition in a vacuum chamber, which is a slow, expensive process step. Thickness control an also be challenging, potentially giving rise to variations in the transmissivity of a resultant dynamic glass elements from run to run.

Embodiments described herein derive significant advantage over such prior-art adhesion layers by the inclusion of a non-metallic self-assembled-monolayer-based adhesion layer that improves adhesion of nucleation layer 124 on transparent electrode 120 in a less costly, less complex, and highly repeatable manner.

To form adhesion layer 122, substrate 102 is immersed in solution 302, which enables the adhesion layer to form on transparent conductor 120.

Figure 3A:
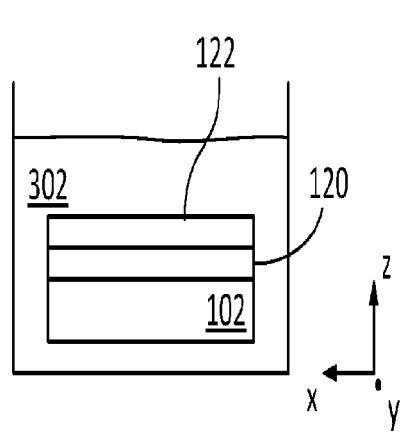
FIGS. 3A-D depicts a dynamic-glass-based window at different stages of its fabrication in accordance with the illustrative embodiment.

FIG. 3A depicts the formation of adhesion layer 122 in solution 302.

Solution 302 is an ethanolic solution of 10 mM 3-mercaptopropionic acid. Typically, substrate 102 immersed in solution 302 for approximately 24 hours, followed by ethanol and water rinses. In some embodiments, adhesion layer 122 is formed via another wet-processing method, such as spray coating, spin coating, and the like.

The resulting adhesion layer (i.e., adhesion layer 122) is an organic self-assembled monolayer (SAM) comprising 3-mercaptopropionic acid. Other materials suitable for use in adhesion layer 122 include, without limitation, non-metallic self-assembled monolayers, mercapto-organic acids, cyanic acids, silanes, thiols, phosphoric acid, phosphonic acids, amino acids, and the like.

At operation 403, nucleation layer 124 is formed on adhesion layer 122 to complete the formation of window electrode 106.

Nucleation layer 124 is formed via an immersion of substrate 102 in solution 304, which is an aqueous solution containing nanoparticles comprising a noble metal (e.g., platinum, palladium, gold, etc.) or an electrochemically stable material (e.g., carbon, etc.). In the depicted example, solution 304 is an aqueous solution containing one part 3-nm diameter platinum (Pt) nanoparticles and three parts water. Substrate 102 is immersed in solution 304 for 72 hours, then rinsed with water and dried in nitrogen, yielding a self-assembled monolayer (SAM) of platinum nanoparticles. The resultant Pt monolayer functions as a spatially distributed seed layer for metal nucleation, thereby enabling substantially uniform metal electrodeposition across the entire area of electrode 106. In some embodiments, solution 304 includes nanoparticles comprising a different noble metal, having a diameter other than 3 nm, and/or having a dilution other than 1:3.

Figure 3B:
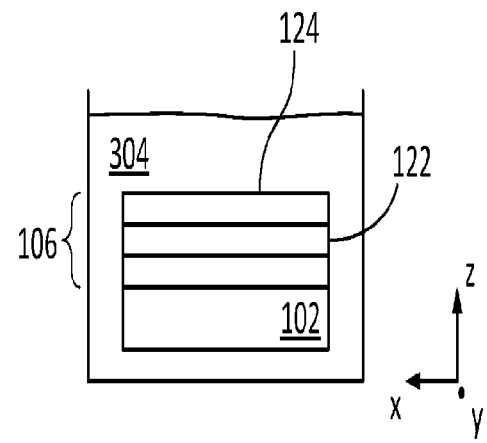

FIG. 3B depicts the formation of nucleation layer 124 in solution 304.

One skilled in the art will recognize, after reading this Specification, that the sub-operations described herein for operation 201 are merely exemplary and that many alternative/additional operations can be employed without departing from the scope of the present disclosure. For example, operation 201 can include additional sub-operations, such as annealing, to reduce the immersion time required to form nucleation layer 124, alternative materials and/or solutions can be used operation 302 (e.g., the concentration of 3-mercaptopropionic acid used in solution 302 can be other than 10 mM, SAM solutions other than 3-mercaptopropionic acid can be used, etc.), the nanoparticles included in solution 304 can have sizes other than 3 nm and/or include materials other than platinum, and the like.

Returning now to method 200, at operation 202, counter electrode 108 is formed on surface 126 of substrate 104.

Substrate 104 is analogous to substrate 102 described above. It should be noted, however, that in some embodiments, one of substrates 102 and 104 is substantially opaque for light 114. In some embodiments, at least one of substrates 102 and 104 comprises a material other than glass, such as a plastic, semiconductor, metal, ceramic, composite material, and the like.

Counter electrode 108 is an annulus of electrical conductor disposed around the perimeter of substrate 104 such that the counter electrode is in contact with electrolyte 110 when window 100 is fully assembled. In the depicted example, counter electrode 108 comprises copper. In some embodiments, counter electrode 108 has a shape other than a square, such as a rectangle, circle, ellipse, irregular shape, and the like. In some embodiments, counter electrode 108 is a transparent conducting electrode. In some embodiments, counter electrode 108 comprises a grid or matrix of small-linewidth traces (e.g., a fine mesh or grid, etc.).

Figure 3C:
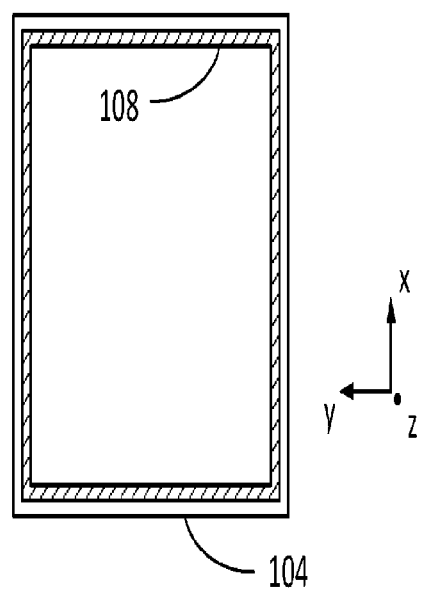

FIG. 3C shows counter electrode 108 disposed on substrate 102.

In some embodiments, at least one of window electrode 106 and counter electrode 108 includes a surface layer comprising the metal of metal 116 such that the surface layer functions as a metal source during electrodeposition.

At operation 203, substrates 102 and 104 are mounted in frame 112 to define chamber 306, which is configured such that window electrode 106 and counter electrode 108 are separated by gap g having separation s along the z direction. Frame 112 is a conventional mechanically rigid annulus of structural material suitable for holding the substrates in a fixed relationship with one another. At operation 203, frame 112 is not completely sealed to enable the introduction of electrolyte 110 into gap g. In some embodiments, frame 112 is a flexible frame comprising an elastomer, such as rubber, silicone, etc.

Figure 3D:
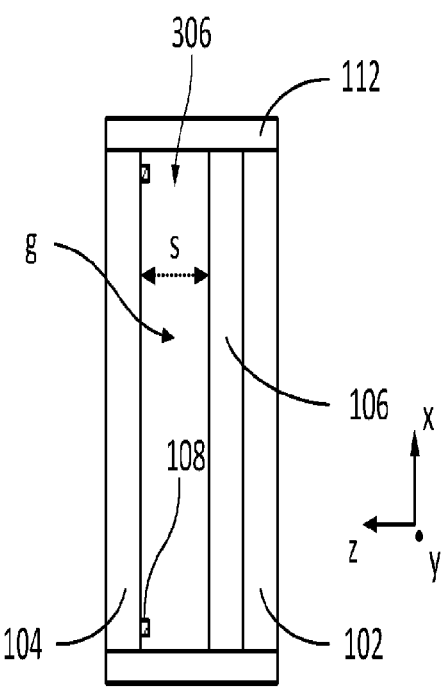

FIG. 3D shows substrates 102 and 104 in their final configuration, in which window electrode 106 and counter-electrode 108 are separated by gap g, having a separation distance of s.

At operation 204, electrolyte 110 is formed as a solution comprising solvent 128, ions of metal 116, and additive 130.

In the depicted example, solvent 128 is deionized water. In some embodiments, solvent 128 is a different aqueous solvent.

In the depicted example, ions of metal 116 are provided in electrolyte 110 via the addition of water-soluble metal compounds, including lead perchlorate ($Pb(ClO_4)_2$), cupric chloride ($CuCl_2$), copper(II) perchlorate ($Cu(ClO_4)_2$), and lithium perchlorate ($LiClO_4$) to solvent 128.

The lead perchlorate serves as a source of lead ions ($Pb^{2+}$), which are balanced by non-coordinating perchlorate anion ($ClO_4-$). The cupric chloride and copper(II) perchlorate function as sources of copper ions ($Cu^{2+}$). The cupric chloride serves as a source of chlorine anions ($Cl^-$), which function as a copper electrodeposition and stripping accelerant. However, the low solubility of lead chloride ($PbCl_2$) reduces the concentration of $Cl^-$ in solutions containing $Pb^{2+}$. The copper(II) perchlorate, therefore, is provided to serve as an additional source of $Cu^{2+}$ in the electrolyte, which shifts the speciation of $Cl^-$ in the electrolyte to favor the formation of soluble Cu—Cl complexes such as $CuCl_4^{2-}$ due to Le Châastelier's principle.

Typically, a high concentration of lithium perchlorate is included to serve as a supporting electrolyte to increase the ionic conductivity of the solution. In some embodiments, a different electrolyte is used, such as a gold/copper electrolyte, a bismuth/copper electrolyte, and the like.

It should be noted that a wide range of metals and metal ions can be included in electrolyte 110 without departing from the scope of the present disclosure.

As noted above, prior-art aqueous electrolytes have a limited temperature range, since they freeze at approximately 0° C. and boil at approximately 100° C. It is an aspect of the present disclosure, however, that the addition of antifreeze molecules and/or mixtures to the electrolyte can expand its temperature stability range significantly. As a result, electrolyte 110 is formed such that it includes additive 130.

Additive 130 is a mixture that extends the temperature range over which solvent 128 is stable and remains in liquid phase. As a result, additive 130 extends the operational temperature range for electrolyte 110.

In the depicted example, additive 130 is methanol. It should be noted, however, that myriad antifreeze molecules can be included in electrolyte 110 without departing from the scope of the present disclosure. Antifreeze molecules/mixtures suitable for use in embodiments in accordance with the present disclosure include, without limitation, alcohols (e.g., methanol, ethylene glycol, glycerol, etc.), metal salts (e.g., calcium dichloride ($CaCl_2$), magnesium chloride ($MgCl_2$), ammonium chloride ($NH_4Cl$), sodium sulfate ($Na_2SO_4$), etc.), sugars (e.g., trehalose, glucose, etc.), cryoprotectants (e.g., DMSO, etc.), and the like.

Figure 5:
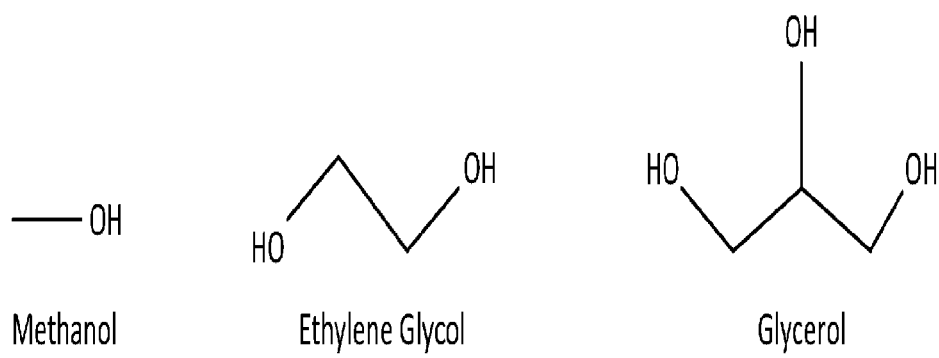
FIG. 5 depicts structures of exemplary anti-freezes suitable for use in accordance with the present disclosure.

FIG. 5 depicts structures of exemplary alcohol-based anti-freezes suitable for use in accordance with the present disclosure.

Additive 130 is included in electrolyte such that its concentration is greater than 0% and typically less than or equal to 70%. It should be noted that the concentration of additive can exceed 70% without departing from the scope of the present disclosure; however, as the concentration of additive exceeds 70%, the rate of electrodeposition decreases and chemical solubility is degraded without significant additional increase in the stable temperature range of the electrolyte.

Figure 6:
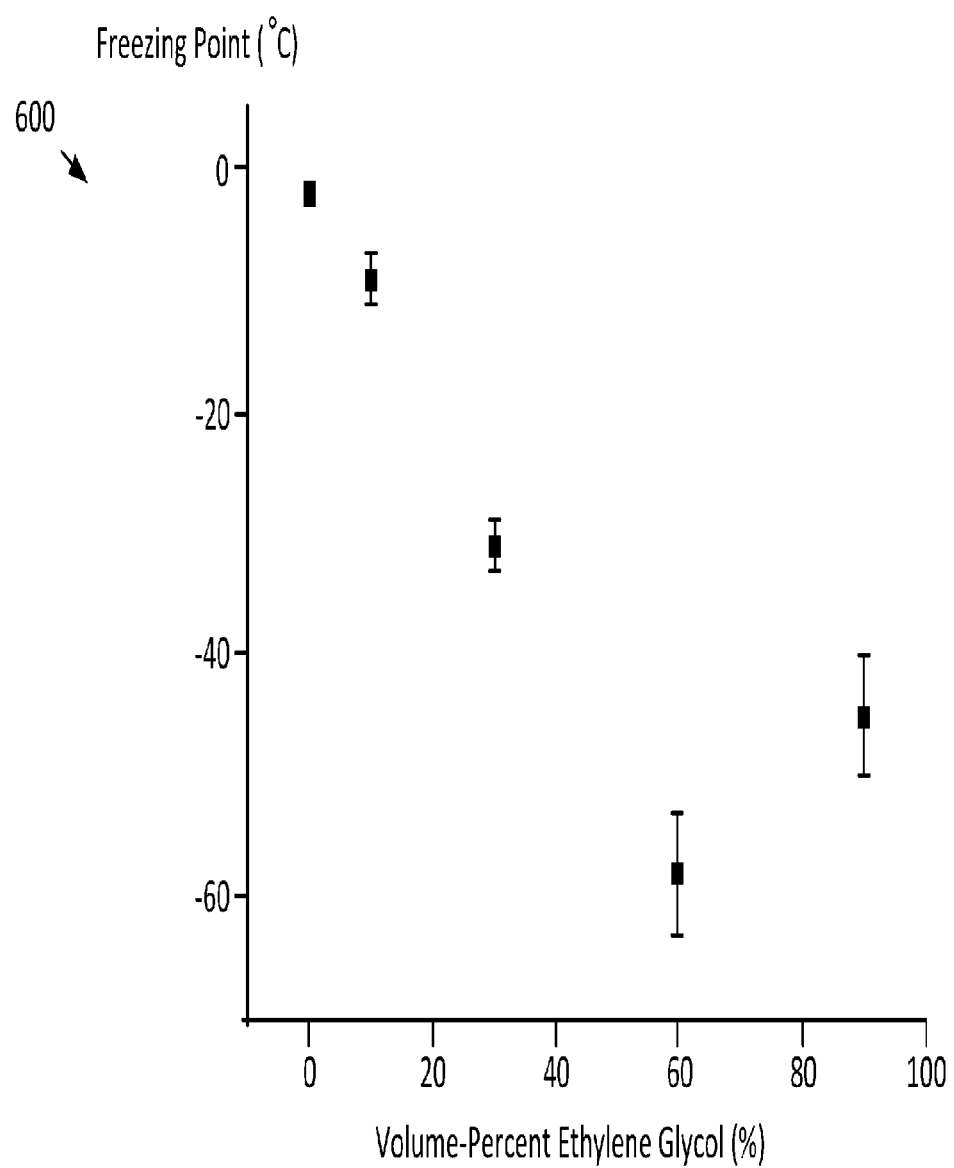
FIG. 6 depicts a plot of electrolyte freezing point versus additive concentration.

FIG. 6 depicts a plot of electrolyte freezing point versus additive concentration. Plot 600 shows the freezing point of an aqueous electrolyte for concentrations of ethylene glycol from 0% to 90%. It is clear from plot 600 that, up to a concentration of approximately 60%, the addition of ethylene glycol to electrolyte 110 significantly lowers its freezing point. After a concentration of 60% is reached, little or no additional benefit with respect to expanding the stable temperature range of the electrolyte is realized, however.

In the depicted example, additive 130 has a concentration of approximately 60% in electrolyte 110 (i.e., the ratio of additive to solvent is approximately 3:2). As discussed below, an aqueous electrolyte having a 60:40 methanol to water ratio has a stable temperature range from approximately −40° C. to approximately 110° C.

In some embodiments, electrolyte 110 includes one or more additives for increasing its viscosity to form a gel electrolyte. In some embodiments, electrolyte 110 includes a polymer gel that can be hardened by inducing it to cross-link (e.g., via exposure to ultraviolet energy, microwaves, etc.).

At operation 205, chamber 306 is filled with electrolyte 110.

At operation 206, chamber 306 is sealed with a sealant that is substantially non-reactive with electrolyte 110 to trap the electrolyte inside window 100.

In the depicted example, frame 112 is sealed using butyl rubber; however, any practical sealant material can be used without departing from the scope of the present disclosure.

To enable controlled transmissivity of window 100, window electrode 106 and counter electrode 108 are electrically connected to conventional voltage source 132.

To reduce the transmissivity of window 100, a negative voltage potential is applied to window electrode 106, relative to counter electrode 108. This gives rise to reduction of the metal ions in electrolyte 110 and electrodeposition of metal 116 on the surface of the window electrode. As the surface of the window electrode becomes coated with metal 116, its transmission decreases according to the thickness of the growing metal layer.

To increase the transmissivity of window 100, metal 116 is stripped from window electrode by reversing the polarity of the voltage potential applied between window electrode 106 and counter electrode 108.

Figure 7:
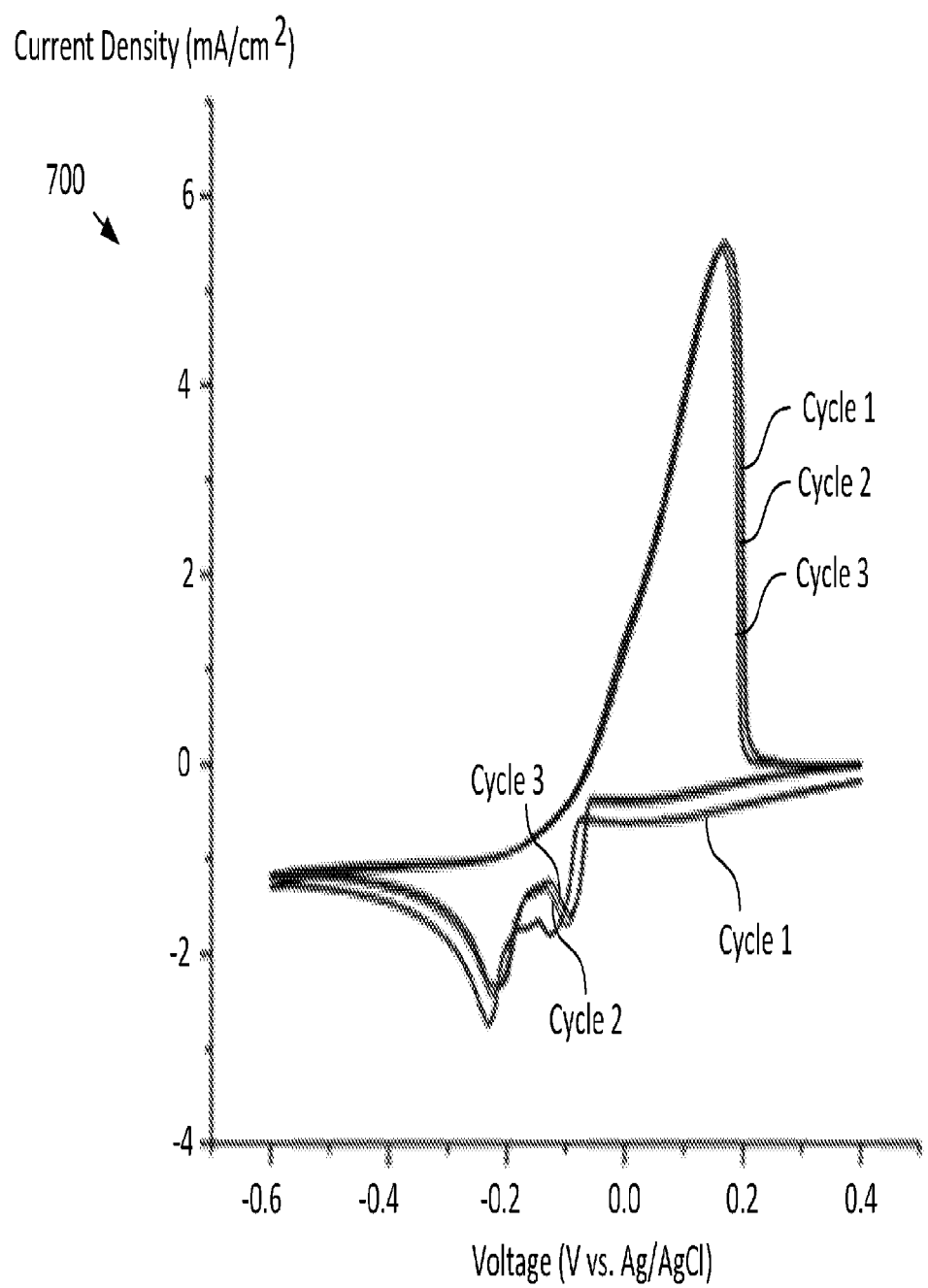
FIG. 7 depicts plots of measured cyclic voltammograms for an additive-free aqueous electrolyte.

FIG. 7 depicts plots of measured cyclic voltammograms for an additive-free aqueous electrolyte. The electrolyte was measured while contained in a structure analogous to that of window 100. Plot 700 shows the first three cycles of Cu and Bi electrodeposition and dissolution in electrolyte 100 without the addition of additive 130. The cathodic going scan of the current-voltage relationship shows two reductive peaks. The more positive of the two peaks, occurring around −0.1 V vs. Ag/AgCl corresponds to Bi electrodeposition while the second cathodic peak around −0.2 V corresponds to Cu electrodeposition. The prominent anodic peak at −0.1 V corresponds to the dissolution of both Bi and Cu metal.

It should be noted that the onset potential for Bi electrodeposition shifts from about −0.1 V to −0.075 V when comparing cycle one versus cycles two and three. This shift in potential is due to the establishment of stable nuclei after the first cycle of electrodeposition. Once these metal nuclei are formed, it is more thermodynamically favorable for metal deposition to occur on these established nuclei than to occur on bare areas on the ITO surface, giving rise to the positive shift in the onset potential.

Figure 8:
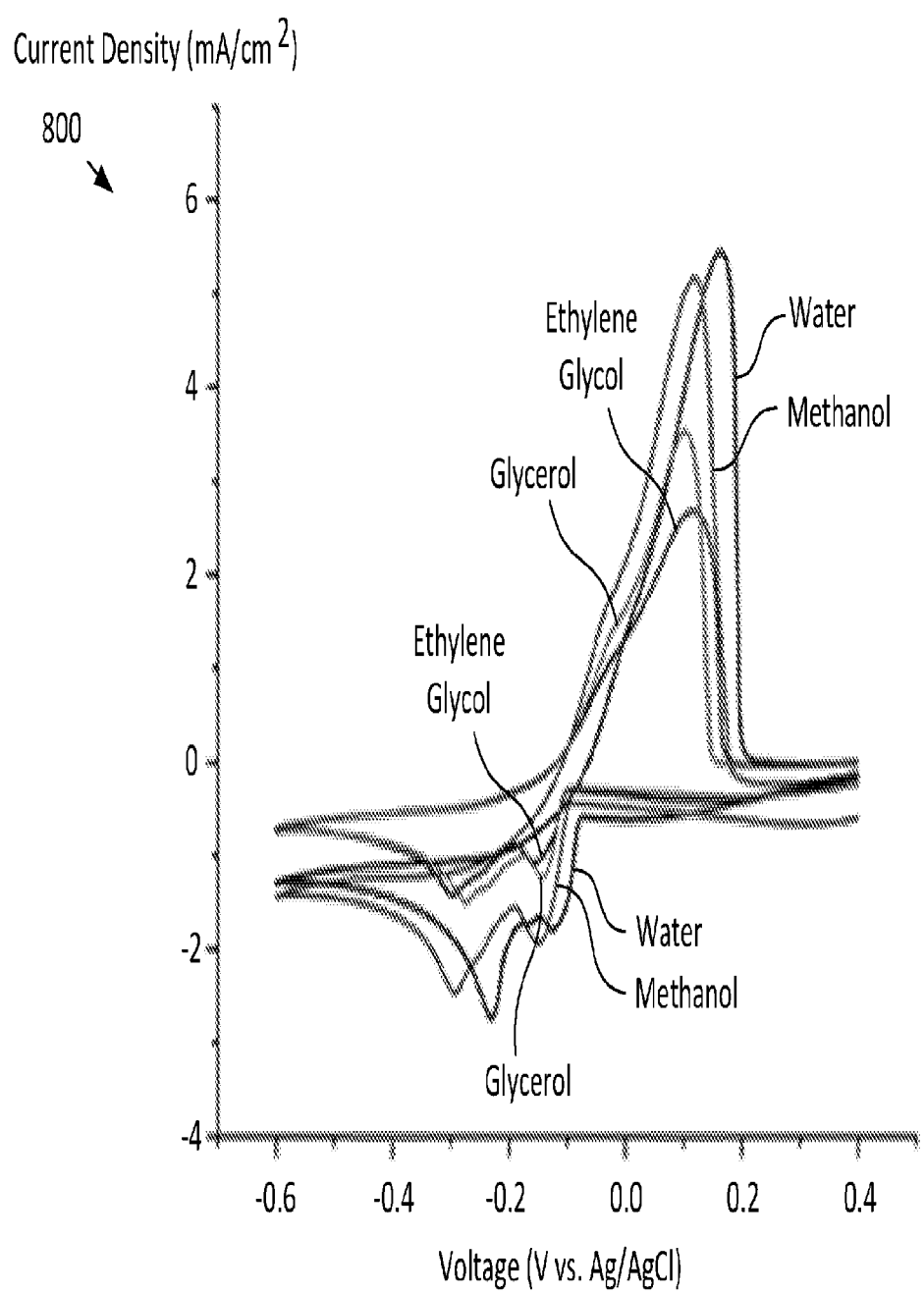
FIG. 8 depicts plots of measured cyclic voltammograms for different aqueous electrolytes in accordance with the present disclosure.

FIG. 8 depicts plots of measured cyclic voltammograms for different aqueous electrolytes in accordance with the present disclosure. The data shown in plot 800 was obtained for electrolyte mixtures using a Pt-modified ITO on glass working electrode (e.g., window electrode 106) at a scan rate of 20 mV/s., where the electrolyte mixtures included antifreezes added to the electrolyte at a volume percentage of 60% with water making up the remaining 40%. Specifically, plot 800 depicts measured CV data for Cu—Bi electrolytes that are additive-free and 60:40 mixtures of methanol:$H_2O$, ethylene glycol: $H_2O$, and glycerol: $H_2O$.

Careful review of plot 800 reveals that the presence of additive 130 in electrolyte 110 realizes important changes in the voltammetric response of the system, although the main features of the voltammetry are still present. All four CVs shown in plot 800 contain two reductive peaks, corresponding to Bi and Cu electrodeposition and possess a stripping peak, indicating at least some electrochemical reversibility of the system. However, the onset deposition for Bi systematically changes as the number of alcohol groups increases with additive 130, as seen from Table 1 below.

TABLE 1

Bi-deposition onset (mV vs. Ag/AgCl) and the Cu and Bi Tafel slopes as a function of the solvent-electrolyte systems of plot 800.

| Electrolyte Solvent System | Bi Deposition Onset (mV) | Cu Tafel (mV/decade) | Bi Tafel (mV/decade) |
| --- | --- | --- | --- |
| $H_2O$ | −79 | 121 | 40 |
| 60:40 vol % Methanol:$H_2O$ | −98 | 459 | 41 |
| 60:40 vol % Ethylene Glycol:$H_2O$ | −105 | 468 | 45 |
| 60:40 vol % Glycerol:$H_2O$ | −105 | 472 | 42 |

In particular, the Bi deposition onset potential progressively shifts from −79 mV to −105 mV when changing the electrolyte from water to those containing methanol, ethylene glycol, or glycerol. Furthermore the Tafel slopes corresponding to the Cu and Bi electrodeposition also possess important trends. Whereas the Bi electrodeposition Tafel slope does not change with electrolyte composition and remains relatively constant at about 40 mV/decade, the Tafel slope for Cu deposition changes dramatically and increases from ~120 mV/decade when water is used as a solvent to ~470 mV/decade when glycerol is used as a solvent. The increase with Bi deposition onset with increasing number of alcohol groups suggests that the metal nucleation becomes more impeded. Likewise the progressive increase in the Cu Tafel slope suggests that Cu electrodeposition is progressively inhibited as the number of alcohol groups in additive 130 increases.

Figure 9A:
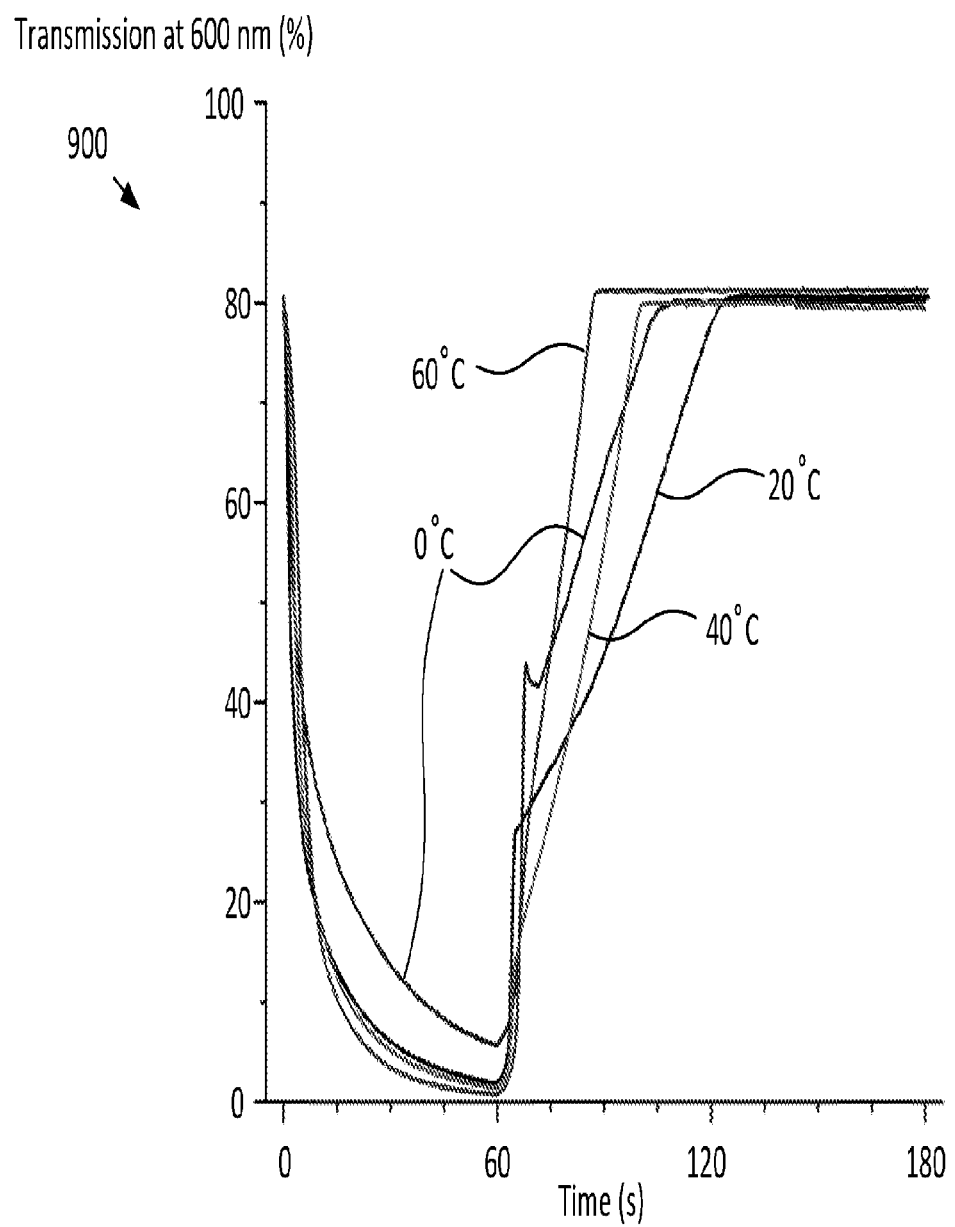
FIGS. 9A-B depict transmission profiles as a function of time for dynamic windows comprising an additive-free electrolyte and an electrolyte in accordance with the present disclosure, respectively.
Figure 9B:
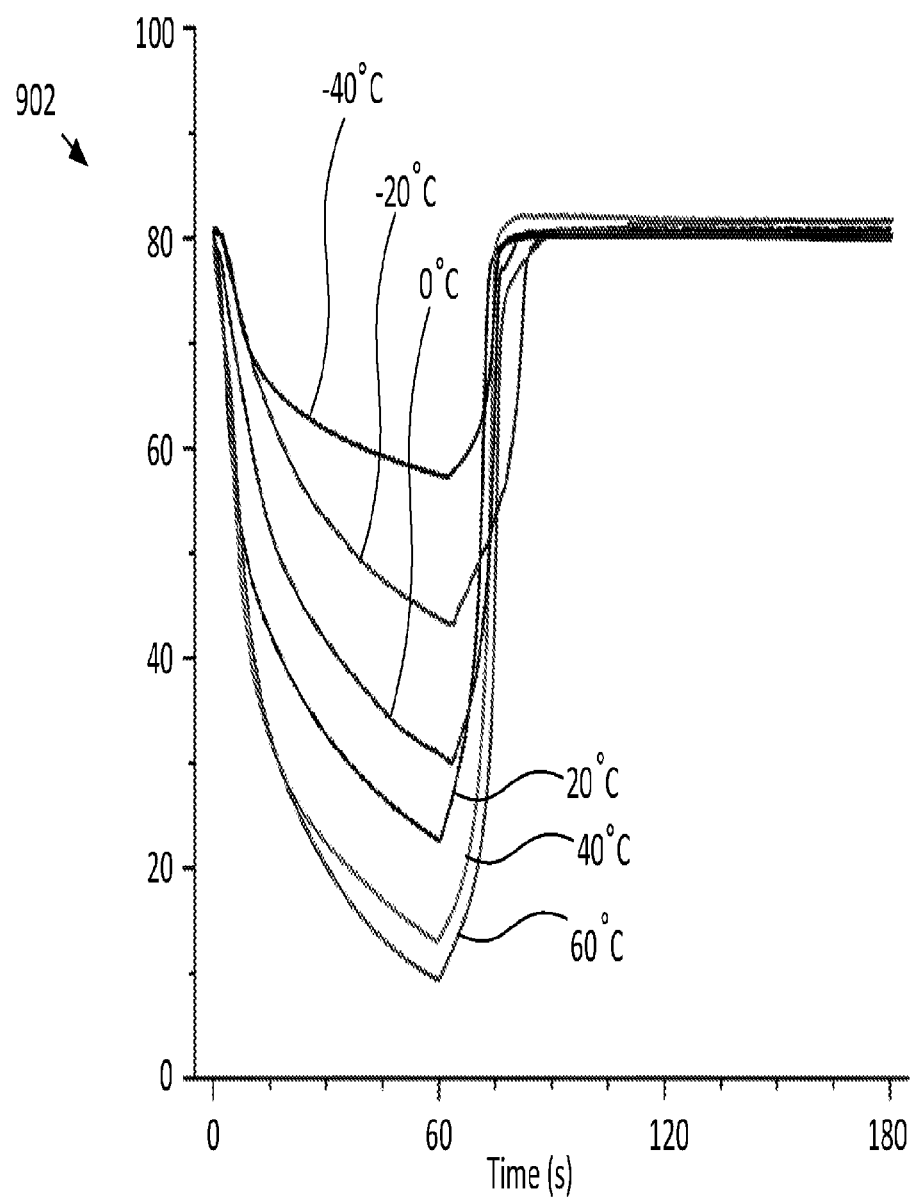

FIGS. 9A-B depict transmission profiles as a function of time for dynamic windows comprising an additive-free electrolyte and an electrolyte in accordance with the present disclosure, respectively.

Plot 900 shows the transmission of light having a wavelength of 600 nm through a 25 mm$^2$ dynamic window that includes a water-based Cu—Bi electrolyte without the inclusion of additive 130. In its original (unbiased) state, the window has a transmission of approximately 80%. To induce metal deposition and tint the window (i.e., reduce its transmissivity), the window is biased with a voltage of −0.6 V. When the window is held at a temperature of 0° C., after 60 seconds of tinting, its transmissivity is reduced to approximately 9%.

To reverse the tinting process, the bias voltage is set to +0.6 V. After 120 seconds at this voltage, the window is restored to its original transmission of 80%.

Plot 900 shows that the transmissivity of the window (and, therefore, its contrast ratio) after 60 seconds of tinting is a function of temperature. When the temperature of the window is increased, the contrast ratio of the window after 60 seconds of tinting progressively increases. This indicates that the metal electrodeposition process occurs more rapidly at higher temperatures. For window temperatures of 20° C. through 60° C., the transmission of the window after 60 seconds of tinting is only approximately 1%. It should be noted that the window cannot be operated at temperatures below about −2° C. due to freezing of the unmodified aqueous electrolyte.

Plot 902 shows the transmission of light having a wavelength of 600 nm through a 25 mm$^2$ dynamic window having a water-based Cu—Bi electrolyte that includes additive 130 such that the additive includes ethylene glycol and the electrolyte has a 60:40 additive:$H_2O$ ratio. Like the additive-free electrolyte window discussed above, in its original (unbiased) state, this window has a transmission of approximately 80%. However, the level to which its transmission is reduced after 60 seconds of tinting is more strongly dependent upon the temperature of the window. It should be noted that, in contrast to an additive-free, aqueous-electrolyte-based window, the additive-containing window can be switched without issue at temperatures as low as −40° C.

It can be seen from plot 902 that the transmission of the window is fully reversible at temperatures from −40° C. to 60° C. with larger contrast ratios occurring at higher temperatures. It should be noted that the use of electrolytes containing additives of methanol or glycerol show similar trends in their temperature-switching profiles.

Figure 10:
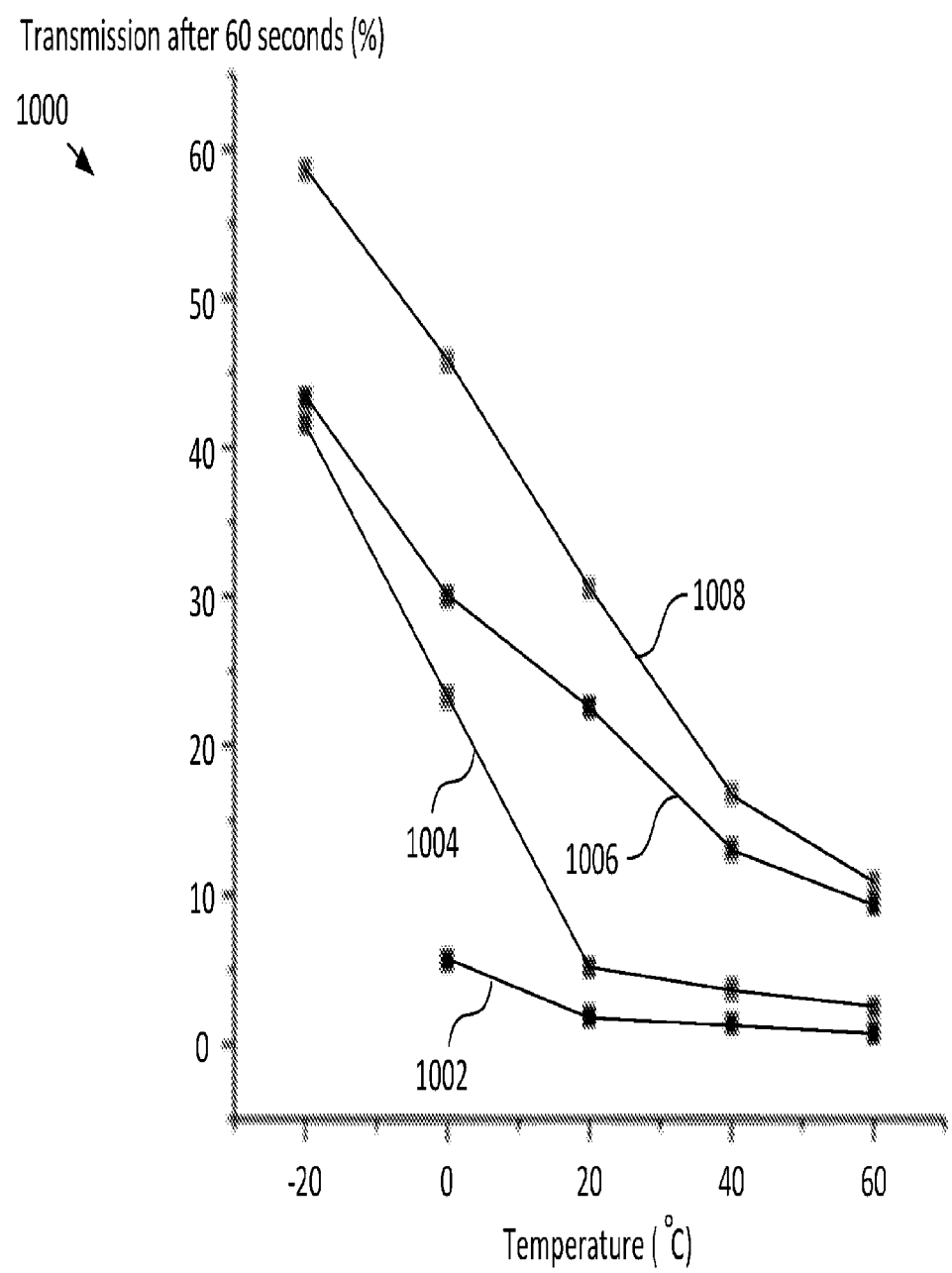
FIG. 10 depicts plots of the transmission of active windows having different electrolyte mixtures after 60 seconds of metal electrodeposition.

FIG. 10 depicts plots of the transmission of active windows having different electrolyte mixtures after 60 seconds of metal electrodeposition. Plot 1000 includes traces 1002, 1004, 1006, and 1008. Trace 1002 shows the results for Cu-Bi electrolyte water-based electrolyte without additive 130. Traces 1004, 1006, and 1008 show the results for 60:40 additive: $H_2O$ Cu—Bi electrolyte mixtures with additives of methanol, ethylene glycol, and glycerol, respectively. It is clear from plot 1000 that increasing the number of alcohol groups in additive 130 results in lower minimum achievable transmissions after 60 seconds.

It should be noted that the window comprising the methanol mixture has very similar contrast ratios from 20° C. to 60° C. as the additive-free window; however, the presence of the methanol enables the window to operate at temperatures well below 0° C., which indicates that the addition of methanol to the electrolyte improves the thermal stability of the dynamic windows without significantly inhibiting device switching speed at room temperature.

Figure 11:
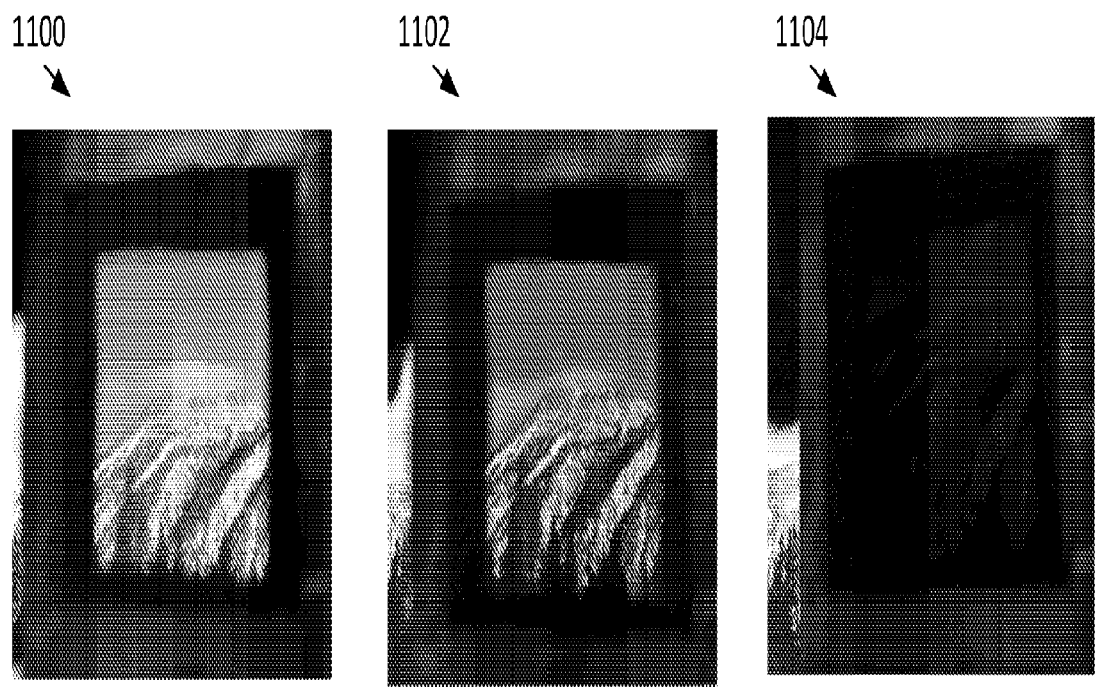
FIG. 11 depicts photographs of a dynamic window containing an aqueous Cu—Bi electrolyte with an additive of ethylene glycol at different transmissivities in accordance with the present disclosure.

FIG. 11 depicts photographs of a dynamic window containing an aqueous Cu—Bi electrolyte with an additive of ethylene glycol at different transmissivities in accordance with the present disclosure. The photographs show the dynamic window undergoing switching in an outside environment in sub-freezing weather without issue. Specifically, photographs 1100, 1102, and 1104 show the window in its original state, after 30 seconds of tinting, and after 180 seconds of tinting, respectively. It should be noted that the window shows no apparent sings of non-uniformity in the metal electrodeposition process due to the low temperatures.

It is to be understood that the disclosure teaches just some examples of the illustrative embodiment and that many variations of the invention can easily be devised by those skilled in the art after reading this disclosure and that the scope of the present invention is to be determined by the following claims.

What is claimed is:

1. A dynamic-glass element (100) comprising:
   a first electrode (106);
   a second electrode (108); and
   an electrolyte (110) that facilitates electrodeposition of a first metal on at least one of the first and second electrodes, wherein the electrolyte is located between the first and second electrodes, wherein the electrolyte includes an aqueous solvent (128) and an additive (130), the additive being characterized by a Tafel slope that is less than or equal to 120 for the first metal, and further wherein the solvent is stable over a first temperature range and the electrolyte is stable over a second temperature range that is larger than the first temperature range.

2. The dynamic-glass element of claim 1 wherein the additive comprises an alcohol.

3. The dynamic-glass element of claim 2 wherein the alcohol is selected from the group consisting of methanol, ethylene glycol, and glycerol.

4. The dynamic-glass element of claim 1 wherein the first metal is bismuth.

5. The dynamic-glass element of claim 1 wherein the electrolyte is a gel electrolyte.

6. The dynamic-glass element of claim 1 wherein the first electrode includes a first layer (124) and a transparent conductor (120), wherein the first layer is in physical contact with the electrolyte.

7. The dynamic-glass element of claim 6 wherein the first electrode further includes a non-metallic adhesion layer (122) that is operative for adhering to each of the first layer and the transparent conductor wherein the adhesion layer is a self-assembled monolayer.

8. The dynamic-glass element of claim 7 wherein the adhesion layer comprises a material selected from the group consisting of thiols, silanes, phosphonic acids, mercaptoorganic acids, cyanic acids, phosphoric acid, and amino acids.

9. The dynamic-glass element of claim 1 wherein the solvent is characterized by a freezing point of 0° C., and wherein the electrolyte has a freezing point that is less than 0° C.

10. A method for forming a dynamic glass element (100), the method comprising:
    providing a first electrode (106) disposed on a first substrate (102);
    providing a second electrode (108) disposed on a second substrate (104);
    arranging the first and second substrates to define a chamber (306);
    selecting an additive (130) that is characterized by a Tafel slope that is less than or equal to 120 for a first metal; and
    providing an electrolyte (110) in the chamber such that each of the first and second electrodes is in contact with the electrolyte, wherein the electrolyte facilitates electrodeposition of the first metal on at least one of the first and second electrodes and includes an aqueous solvent (128) and the additive, and wherein the solvent is stable over a first temperature range and the electrolyte is stable over a second temperature range that is larger than the first temperature range.

11. The method of claim 10 wherein the electrolyte is provided such that the additive comprises an alcohol.

12. The method of claim 11 wherein the alcohol is selected from the group consisting of methanol, ethylene glycol, and glycerol.

13. The method of claim 10 wherein the first metal is bismuth.

14. The method of claim 10 wherein the first electrode is provided as a multi-layer electrode comprising a nucleation layer (124) that is disposed on an adhesion layer (122) that is disposed on a transparent conductor (120) that is disposed on the first substrate.

15. The method of claim 14 wherein the nucleation layer includes a monolayer of nanoparticles, each of which includes a noble metal.

* * * * *